United States Patent [19]

Sato et al.

[11] Patent Number: 4,670,348
[45] Date of Patent: Jun. 2, 1987

[54] ELECTRICAL APPLIANCE IMPREGNATED WITH A CURABLE IMPREGNANT COMPOSITION

[75] Inventors: Atsushi Sato, Tokyo; Keiji Endo, Yokosuka; Hideyuki Dohi, Tokyo; Shigenobu Kawakami, Ichikawa, all of Japan

[73] Assignee: Nippon Petrochemicals Co., Ltd., Tokyo, Japan

[21] Appl. No.: 687,978

[22] Filed: Dec. 31, 1984

[30] Foreign Application Priority Data

Jan. 9, 1984 [JP] Japan ................................ 59-892

[51] Int. Cl.$^4$ ..................... B32B 15/08; B32B 27/00
[52] U.S. Cl. ................................ 428/461; 428/375; 428/379; 428/467; 428/523
[58] Field of Search ............. 428/457, 462, 461, 467, 428/500, 523, 375, 379; 427/79; 525/242; 361/314

[56] References Cited

U.S. PATENT DOCUMENTS

| Re. 27,823 | 11/1973 | Cox | 427/79 X |
| 1,688,478 | 10/1928 | Weiss | 427/79 X |
| 3,928,705 | 12/1975 | Loft et al. | 427/79 X |
| 4,190,682 | 2/1980 | Shaw | 427/79 |

FOREIGN PATENT DOCUMENTS

| 2248716 | 6/1963 | Fed. Rep. of Germany | 427/79 |
| 1945118 | 3/1970 | Fed. Rep. of Germany | 427/79 |
| 56-21201 | 5/1981 | Japan | 427/79 |

Primary Examiner—Lorraine T. Kendell
Attorney, Agent, or Firm—Bucknam and Archer

[57] ABSTRACT

An electrical appliance impregnated with a curable impregnant composition comprising as the curable ingredient at least one aromatic olefin and/or diolefin having a plurality of condensed- or noncondensed-type aromatic rings.

12 Claims, No Drawings

ELECTRICAL APPLIANCE IMPREGNATED WITH A CURABLE IMPREGNANT COMPOSITION

BACKGROUND OF THE INVENTION

This invention relates to a curable impregnant composition for use in impregnating electrical appliances.

Electrical appliances such as condensers and transformers, have recently been earnestly required to have a higher voltage resistance, greater capacitance and smaller size than conventional ones. To meet these requirements, there have been proposed impregnation-type condensers and transformers prepared by being impregnated with an impregnant and then cured in order to improve their electric characteristics. Further, in connection with said requirements, a part or the entire amount of the insulating material or dielectric material such as insulating paper for electric appliances has been substituted by plastics.

Heretofore, styrene monomer which is one of aromatic olefins, has been used as an impregnant for electrical appliances. This monomer is impregnated together with a suitable curing agent such as an organic peroxide and is then cured for use. However, styrene monomer is not desirable as an impregnant for electrical appliances in which plastics are used as a dielectric or insulating material since it has disadvantages such as solubility to plastics.

Further, an unsaturated, styrene dimer having two aromatic rings, such as 1,4-diphenyl-butene-1, has been proposed to be used as one of the ingredients of an electrical insulating oil for impregnation (U.S. Pat. No. 4,347,169), however, it is used only for impregnation and is not cured when used.

Still further, British Pat. No. 855,004 discloses that diisopropenyl diphenylmethane or the like which is a diolefin having two aromatic rings is used as a crosslinking agent for polystyrene, however, this Patent discloses nothing about the use of such a diolefin as a curable impregnant, particularly a curable impregnant for electrical appliances.

BRIEF SUMMARY OF THE INVENTION

It is an object of this invention to provide a curable impregnant composition which is usable for electric insulation, will sparingly swell plastics when used therein, and is suitable for impregnating electrical appliances wherein at least a part of the dielectric or insulating material is made of plastics.

DETAILED DESCRIPTION OF THE INVENTION

The curable impregnant composition of this invention contains as the curable ingredient an aromatic monoolefin or diolefin having a plurality (two or three for example) of condensed- or noncondensed-type aromatic rings.

For example, aromatic monoolefins or diolefins having two aromatic rings are illustrated by the compounds having the following general formulae (I) to (III):

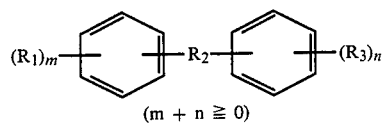

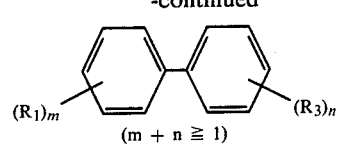

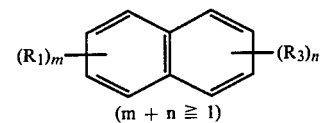

wherein $R_1$, $R_2$ and $R_3$ are each an aliphatic hydrocarbon residue or group which may contain one or two double bonds, m and n are each zero or a positive integer; $mR_1$ and $nR_3$ are identical with or different from each other; and the sum of double bonds of all the groups or residues in each of said formulae is 1 or 2.

It is preferable that the aromatic olefins represented by the above formulae (I) to (III) have a molecular weight of 300 or less.

The aromatic olefins having a molecular weight of more than 300 are not preferred since they are not satisfactorily curable.

In the case where $R_1$ and $R_3$ are an unsaturated group, they are illustrated by an alkenyl or cycloalkenyl group which includes vinyl, propenyl, isopropenyl, allyl, butenyl, pentenyl, hexenyl or cyclohexenyl group.

In the case where $R_1$ and $R_3$ are a saturated group, they are illustrated by an alkyl or cycloalkyl group which includes methyl, ethyl, propyl, isopropyl, butyl, isobutyl, sec.-butyl, tert.-butyl, pentyl, hexyl or cyclohexyl group.

In the case where $R_2$ is an unsaturated group, it is illustrated by an alkenylene or cycloalkenylene group which is a divalent substituent obtained by removing two hydrogen atoms from an olefinic hydrocarbon such as ethylene, propylene, butene, isobutene, heptene, hexene or cyclohexene.

In the case where $R_2$ is a saturated group, it is illustrated by an alkylene or cycloalkylene group which is a divalent substituent obtained by removing two hydrogen atoms from a saturated hydrocarbon such as methane, ethane, propane, butane, isobutane, pentane, hexane or cyclohexane.

In addition, $R_1$, $R_2$ and $R_3$ which are an aliphatic hydrocarbon residue, may also form a cyclic side chain as seen in indane, tetralin or the like.

The compounds represented by the general formula (I) include vinylphenylphenylmethane, vinylphenylphenylethane, propenylphenylphenylmethane, propenylphenylphenylethane, diphenylethylene,, diphenylpropene, diphenylbutene and diphenylhexene and also include vinyldiphenylethylene, divinyldiphenylmethane, diisopropenyldiphenylmethane, and vinylphenylindane.

The compounds represented by the general formula (II) include vinylbiphenyl, allylbiphenyl, propenylbiphenyl, cyclohexenylbiphenyl and divinylbiphenyl.

The compounds represented by formula (III) include vinylnaphthalene, divinylnaphthalene, isopropenylnaphthalene and diisopropenylnaphthalene.

The aromatic monoolefins or diolefins having three aromatic rings according to this invention include those derived from an alkylterphenyl, aralkyldiaryl, diaralkylbenzene, arylnaphthalene, aralkylnaphthalene, alkylanthracene or alkylphenanthrene. More specifically, they are illustrated by vinylanthracene and vinylphenanthrene. The above aromatic monoolefins or diolefins may be used singly or in combination.

In addition, they may be incorporated with other curable ingredients such as monocyclic aromatic olefins illustrated by styrene, in an optional ratio as far as the former and latter are compatible with each other.

The above aromatic olefins are only examples of those which are usable in this invention and, therefore, this invention is not limited to these compounds.

Such aromatic olefins may be produced by various synthetic chemical methods as indicated below.

For example, vinylnaphthalene may be obtained by reacting formylnaphthalene with a Grignard reagent such as methyl magnesium iodide and then dehydrating the reaction product. Vinylphenylphenylethane may be obtained by reacting diphenylethane with acetyl chloride in the presence of a Friedel-Craft catalyst to produce acetylphenylphenylethane, reducing the thus produced product with sodium boron hydride and then dehydrating the thus reduced product. Isopropenylphenylphenylethane may be obtained by reacting formylphenylphenylethane with a Grignard reagent such as methyl magnesium iodide and then dehydrating the reaction product. 1,2-diphenylethylene may be obtained by reacting benzaldehyde with benzyl magnesium bromide and then dehydrating the reaction product; 1,2-diphenylpropene may likewise be obtained.

The aromatic diolefins used herein may be obtained for example by producing a Grignard reagent having a vinyl group and aromatic ring from bromostyrene, reacting the thus produced reagent with an aromatic ketone such as acetophenone and then dehydrating the alcohol produced.

Further, the aromatic olefins used in this invention may also be obtained by a method using a dehydrogenation decomposition or like reaction.

With respect to a method using a dehydrogenation reaction, the aromatic olefins used in this invention may be obtained by dehydrogenating in the presence of a suitable dehydrogenating catalyst a saturated aromatic hydrocarbon corresponding to the aromatic monoolefin used in this invention, or a saturated aromatic hydrocarbon or aromatic monoolefin corresponding to the aromatic diolefin used in this invention while inhibiting side reactions such as decomposition and polymerization.

The dehydrogenation catalysts are not particularly limited but any such catalysts may be used.

The dehydrogenation catalysts include oxides or metals such as Cr, Fe, Cu, K, Mg and Ca, the oxides being used singly or in combination, and also include noble metals such as Pt and Pd. These metal oxides and noble metals may be carried on a carrier such as alumina for use as a dehydrogenating catalyst.

The dehydrogenation reaction is carried out at 350°–650° C., preferably 400°–600° C., and the LHSV is 0.2–1.0, preferably 0.5–3.0. Further, steam, nitrogen, hydrogen and like gases may be present in the dehydrogenation system to decrease partial pressures and/or prevent carbon deposition. A suitable diluent may further be used in the dehydrogenation as required, however, if the dehydrogenation is mildly carried out without requiring a very high dehydrogenation rate, then it will be convenient that the feedstock itself can usually be a diluent.

By such dehydrogenation, diphenylethylene may be obtained from diphenylethane, and vinylphenylphenylethane, ethylphenyl-phenylethylene and vinylphenylphenylethylene may respectively be obtained from ethylphenyl-phenylethane. In addition, isopropenylbiphenyl may likewise be obtained from isopropylbiphenyl, and isopropenyl-isopropylnaphthalene, diisopropenylnaphthalene and the like may be obtained from diisopropylnaphthalene.

Further, the aromatic olefins of this invention may be obtained by a decomposition reaction, such as the thermal cracking or catalytic cracking, of for example a triarylalkane, diaralkyl aromatic hydrocarbon, styrene polymer or the like.

These polymers as the starting material, may be pyrolyzed at a temperature of 300°–700° C., preferably 330°–600° C. The use of a too low pyrolyzing temperature will retard the decomposition velocity, whereas the use of too high a pyrolyzing temperature will decompose the starting material to the extent that monocyclic aromatic hydrocarbons are produced therefrom. It is therefore preferable to shorten the contact time in a high-temperature region as far as possible in order to obtain aromatic hydrocarbons in a good yield.

The catalytic reaction may be carried out in a liquid or gaseous phase at a reaction temperature of 300°–700° C., preferably 330°–600° C., using silica gel, silica-alumina, kaolin, dealuminized or non-dealuminized zeolite, or inorganic or organic sulfonic acid as the catalyst.

The aforesaid aromatic olefins may be used in this invention. However, among these various aromatic olefins, the preferred one is an olefin having at least one mono-substituted type double bond or di-substituted type double bond in which one and two substituents are attached to the same carbon atom on the double bond respectively. Particularly preferred is an olefin having at least one mono-substituted type double bond, that is, vinyl group. Such a preferred aromatic olefin is preferable since it is easily curable.

It is preferable that the aromatic olefins used in this invention be in the liquid state at ambient temperature from the view-point of their impregnation or filling up. However, they may be from viscous to solid at ambient temperature if they melt to flow so easily as to be handled without difficulty at an elevated temperature at which they are impregnated or filled up. In addition, they may be used together with a plasticizer, softening agent, filler, extender and other additive which are compatible therewith, and the resulting mixture may be viscous or solid at ambient temperature if it is made liquid at an elevated temperature at which it is impregnated or filled up.

The curable impregnant composition of this invention may contain at least one of the aromatic olefins in such an amount that the composition is satisfactorily curable although the amount of the olefin or olefins contained is not particularly limited. The composition usually contains the olefin or olefins in an amount by weight of at least 5%, preferably at least 10%, thereof.

The impregnant composition of this invention may comprise, besides the aromatic olefins, plasticizers, softening agents, fillers, extender and resins if these additives are compatible with the aromatic olefins.

The plasticizers or softening agents include polybutene, phthalic acid esters such as DOP, animal and vegetable oils such as castor oil, alkylbenzene, diarylalkanes such as phenylxylylethane and benzyltoluene, triarylalkanes, alkylbiphenyls, terphenyl, alkylnaphthalenes and diaralkyl aromatic hydrocarbon such as dibenzyltoluene.

The resins used as an extender or the like include low molecular weight polymers which are illustrated by polymers prepared by polymerizing with monomers containing mainly aromatic olefins such as low molecular weight polystyrene, petroleum resins such as $C_9$-derived or $C_9$-$C_5$-derived petroleum resins, natural resins such as waxes and rosin, xylene resins, atactic polypropylene (APP) and polyester resins.

These low-molecular-weight polymers may be added to the aromatic olefins of this invention in an amount by weight of up to 300 parts per 100 parts by weight of the olefins.

The above polymers, per se, are not used as an impregnant since they are normally solid or semi-solid, and they will not make a satisfactory impregnant even if they are mixed with a plasticizer or softener.

The impregnant composition of this invention may further be incorporated with inorganic fillers such as silica, calcium carbonate, talc and aluminum hydroxide. The composition may still further be incorporated with a conventional known flame-retardant such as tricresylphosphate, trixylylphosphate or triphenylphosphine oxide.

It is preferable that the curable impregnant composition of the present invention be in the liquid state at ambient temperature from the viewpoint of their impregnation or filling up. However, they may be from viscous to solid at an ambient temperature if they melt and flow so easily as to be handled without difficulty at an elevated temperature at which they are impregnated or filled up.

The curable impregnant composition of this invention is suitable for impregnating or filling up electrical appliances therewith.

Electrical appliances to be impregnated with the impregnant composition of this invention, are transformers, condensers and the like. These condensers include those prepared by winding metallic foil as electrode and at least one film selected from paper, plastics films such as polypropylene, polyester, polycarbonate and composite films thereof. In addition, the condensers prepared by winding up metallized paper or plastics films (MF condenser), the metal such as aluminum or zinc being vapor-deposited on one or both sides of the paper or plastics film, are also included.

Impregnants for use for the above MF condensers are required to have more specified properties than those for ordinary condensers having metallic foils as an electrode layer since the vapor-deposited metallic layer is apt to be peeled from the base film in the MF condensers. However, the curable impregnant composition of this invention is particularly suitable for such MF condensers.

In addition, the curable impregnant compositions of this invention are sparingly soluble and swelling in plastics typified by polyolefin prepared by polymerizing an aliphatic olefin, the polyolefin being illustrated by polypropylene, polyethylene or polymethylpentene. Accordingly, they may impregnate or fill up therewith electrical appliances in which at least a part of the dielectric or insulating materials is made of such plastics.

The impregnation may be effected in a conventional known manner. For example, the elements of electrical appliances, such as the element of condensers (capacitors), may be impregnated by dipping the element in a suitably heated impregnant. In a case where the electrical appliance has a case in which the element is housed, an impregnant, suitably heated if required, may be filled in the case for impregnating the element.

The impregnant composition of this invention is impregnated and then treated by suitable means to chemically cure the aromatic olefin or olefins contained in the composition.

As curing means, there are a curing method using heat, a curing method using light radiation such as ultraviolet radiation, a curing method using electron beam radiation, and the like. Any one of them may be used in this invention.

It is preferable to add an initiator such as an organic peroxide in order to cure by heating. The organic peroxides which may be used herein, include acyl peroxides such as benzoyl peroxide and acetyl peroxide, hydro peroxides such as tert.-butyl peroxide and cumene perhydroxyoxide, alkyl peroxides such as methyl ethyl ketone peroxide and cyclohexanone peroxide, and oxy peroxides such as tert.-butyl perbenzoate and tert.-butyl peroxyacetate.

These organic peroxides may be used in an amount by weight of 0.1-10 parts, preferably 0.5-7 parts, per 100 parts by weight of the aromatic olefin according to this invention. The thermal cure may be effected at usually 70°-120° C. for about 5-20 hours.

It is also preferable to use an initiator in curing by the radiation of light. Such curing agents include benzoin ethyl ether, di-tert.-butyl peroxide, azobisisobutyronitrile and dibenzothiazolyl sulfide.

Among said various curing methods, the thermal curing method is the most preferable since it is simple and convenient.

This invention will be better understood by the following Examples and Comparative Examples.

In addition, processes for preparing difficulty available aromatic olefins are indicated below for reference.

Preparation-1

Diethylbiphenyl was dehydrogenated in the presence of steam under the following conditions thereby to obtain a liquid dehydrogenated product containing an aromatic olefin.

Dehydrogenating conditions:
Catalyst: Produced under the trademark "G64A" by Nissan Girdler Catalyst Co. (The catalyst was an iron oxide-derived catalyst containing potassium carbonate and chromium oxide as the adjuvant catalysts.)
Particle size: 14-28 mesh
Temperature: 550°-600° C.
LHSV: 1.0
$H_2O$/Feedstock (weight ratio): 3.0
Pressure: Atmospheric pressure The thus obtained dehydrogenated product contained vinylethylbiphenyl and divinylbiphenyl, and the olefin content thereof was found to be 73.3 wt. % in terms of monoolefins from the fact that the product had a bromine value of 55.0 cg/g.

Preparation-2

Two hundred and fifty (250) ml of dried tetrahydrofuran were incorporated with 14.6 g (0.601 mol) of magnesium and then further incorporated dropwise with 100 g (0.546 mol) of p-bromostyrene while heating to 65° C. thereby obtaining a Grignard reagent. The thus obtained reagent was cooled to 20° C. and then incorporated dropwise with 65.5 g (0.546 mol) of acetophenone to react them together. The resulting reaction mixture was introduced into a mixture of 500 g of crushed ice, 500 g of water and 15 ml of 98% sulfuric acid and then extracted with ether to obtain an alcohol which was the reaction product. The thus obtained alcohol was dehydrated with potassium hydrogen sulfate to obtain 62.8 g (yield: 56%) of normally liquid 1-phenyl-1-(4′-vinylphenyl)ethylene which was the end product.

This end product had a boiling point of 151° C. (10 mm Hg) or 114° C. (2 mm Hg) and the structure thereof was confirmed by NMR spectra and IR spectra.

EXAMPLE 1

A metallized film prepared by vapor depositing aluminum on an "easy-to-impregnate" type 9μ thick oriented propylene film, was wound up to obtain a condenser (capacitor) element having an electrostatic capacity of 3.5 μF. The thus obtained element was subjected at both the ends to metallikon (spray by molten spray) with zinc and lead wires were then soldered to the ends, after which the element was placed in a resin case.

The resin case was then filled up and impregnated with a normally liquid impregnant composition comprising phenyl-(4-vinylphenyl)methane as the impregnant and 2 wt. %, based on the impregnant, of 1,1-bis(t.-butylperoxy)-3,3,5-trimethylcyclohexane (Tradename: PERHEXA 3M) as the initiator.

The impregnant composition filled in the case was heated to 95° C. for 15 hours after the impregnation to cure the composition. The composition so cured was not fluidized at all even at 85° C.

The condenser thus obtained was measured for the time taken prior to its breakdown by applying thereto electric charge at 630 V at room temperature, with the result that the breakdown did not occur at least 100 hours after the start of the measurement.

EXAMPLE 2

A normally viscous liquid impregnant composition comprising 35 wt. % of phenyl-(4-vinylphenyl)methane, 63 wt. % of a C9-derived petroleum resin and 2 wt. %, based on the impregnant, of the same initiator (PERHEXA 3M) as used in Example 1, was filled in the same condenser element-housed resin case as used in Example 1 to impregnate the element and then heated to be cured in the same manner as in Example 1. After having been cured, the composition after heated was not fluidized even at 85° C., this improving that the composition was cured.

The condenser element-housed resin case (condenser) so obtained was subjected to condenser breakage test in the same manner as in Example 1, with the result that the condenser was not broken even after the application thereto of electric charge for at least 100 hours.

COMPARATIVE EXAMPLE 1

The procedure of Example 1 was followed except that styrene was substituted for the phenyl-(4-vinylphenyl)methane which was a bicyclic aromatic olefin. The styrene was polymerized and was not fluidized at 85° C.

The condenser so obtained was charged and subjected to condenser breakage test in the same manner as in Example 1, with the result that the condenser was broken two minutes after the start of application of the charge. The reason for this is considered to be that the styrene enabled the polypropylene to be easily swollen and the metal film formed by vapor deposition was peeled whereby the condenser degraded in performance.

EXAMPLES 3-5

The procedure of Example 2 was followed except that in Example 3 α-vinylnaphthalene was substituted for the phenyl-(4-vinylphenyl)methane which was a bicyclic aromatic olefin, in Example 4 the dehydrogenated product obtained in Preparation-1 was substituted for the phenyl-(4-vinylphenyl)methane and in Example 5 1-phenyl-1-(4′-vinylphenyl)ethylene obtained in Preparation-2 was substituted for the phenyl-(4-vinylphenyl)methane, whereby a normally liquid impregnant composition was obtained in each of Examples 3-5.

Each of the impregnant compositions so obtained was filled in the resin case to impregnate the condenser element therein, after which the composition so impregnated was thermally cured. The composition after heated was not fluidized even at 85° C., this proving that the composition in each resin case was cured.

The condensers thus obtained were each charged at room temperature and tested for its breakage, with the result that none of the condensers were broken even at least 100 hours after the start of the test.

What is claimed is:

1. In an impregnated electrical condenser which has dielectric elements wherein said dielectric elements are impregnated with an impregnant composition and then cured and wherein the dielectric material is at least in part made of plastics, the improvement which comprises impregnating an electrical condenser with an impregnant composition comprising as the curable ingredient at least one olefin selected from the group consisting of aromatic monoolefins and diolefins having a plurality of condensed-or non-condensed-type aromatic rings and then curing the impregnant composition after impregnation, said at least one aromatic olefin having the formula (I), (II), (III) hereinbelow:

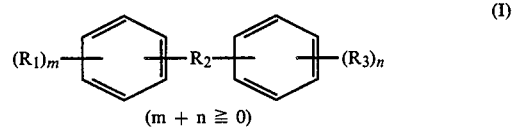

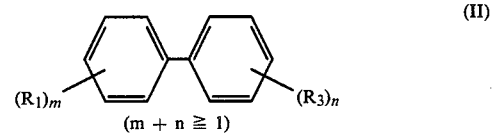

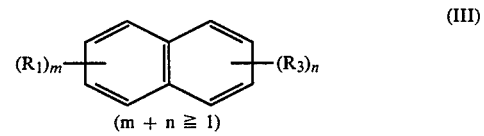

ps wherein $R_1$, $R_2$ and $R_3$ are each an aliphatic hydrocarbon residue or group which contains one or two double bonds; m and n are each zero or an integer of 1 to 3; $mR_1$ and $nR_3$ are the same or different and the sum of double bonds of all said groups or residues in each of said formulae is 1 or 2.

2. An impregnated electrical condenser according to claim 1 wherein the plastics is polypropylene.

3. The condenser according to claim 1 wherein said at least one aromatic olefin is contained in an amount by weight of at least 5% based on the weight of the composition.

4. The condenser according to claim 1, wherein the impregnant composition additionally comprises 0–300 parts by weight of a low-molecular-weight polymer compatible with said at least one aromatic olefin per 100 parts by weight of said olefin.

5. The condenser according to claim 4, wheerein the low-molecular-weight polymer is a petroleum resin prepared by polymerizing a monomer containing mainly aromatic olefins.

6. The condenser according to claim 1, wherein said at least one aromatic olefin has a molecular weight not in excess of 300.

7. A condeser according to claim 1, wherein the condenser is prepared by winding metallized films.

8. A condenser according to claim 1, wherein the impregnant composition additionally comprises 0.1–10 parts by weight of an organic peroxid per 100 parts by weight of the at least one aromatic olefin.

9. A condenser according to claim 1, wherein said at least one aromatic olefin has at least one mono-substituted type double bond or di-substituted type double bond in which the one and two substituents are attached to the same carbon atom of the bouble bond respectively.

10. The condenser according to claim 1, wherein said impregnant composition additionally comprises at least one of a plasticizer, a filler or a resin.

11. The condenser according to claim 5 wherein said petroleum resin is $C_9$–$C_5$ derived petroleum resin.

12. The condenser according to claim 1 wherein said impregnant composition prior to curing is in the liquid state.

* * * * *